United States Patent [19]

Shinohara et al.

[11] Patent Number: 4,737,908
[45] Date of Patent: Apr. 12, 1988

[54] BUFFER MEMORY CONTROL SYSTEM

[75] Inventors: Teru Shinohara, Narita; Hideki Osone, Tokyo, both of Japan

[73] Assignee: Fujitsu Limited, Kawasaki, Japan

[21] Appl. No.: 844,688

[22] Filed: Mar. 27, 1986

[30] Foreign Application Priority Data

Mar. 29, 1985 [JP] Japan .................................. 60-65620

[51] Int. Cl.⁴ .......................................... G06F 13/00
[52] U.S. Cl. .................................................. 364/200
[58] Field of Search ... 364/200 MS File, 900 MS File

[56] References Cited

U.S. PATENT DOCUMENTS 4,575,814 3/1986 Brooks, Jr. et al. ................. 364/900

FOREIGN PATENT DOCUMENTS 60-123944 7/1985 Japan .

OTHER PUBLICATIONS

English Summary of 60-123944.

Primary Examiner—Raulfe B. Zache
Attorney, Agent, or Firm—Staas & Halsey

[57] ABSTRACT

A buffer memory control system for executing an immediate instruction, including a block fetch control unit for generating a first move-in complete signal indicating that the move-in of the heading subblock from a main memory to the buffer memory is completed. In response to the first move-in complete signal, the fetch and store operation starts without waiting for the completion of the move-in of a full block.

10 Claims, 7 Drawing Sheets

| Fig. 4 A | Fig. 4 B |

BUFFER MEMORY CONTROL SYSTEM

BACKGROUND OF THE INVENTION

1. Field of the Invention

The present invention relates to a buffer memory control system in a data processing apparatus. The system according to the present invention is applicable to a data processing system including a main memory and a central processing unit having a buffer memory for storing a copy of a portion of the information stored in the main memory, wherein speed-up of the access process to the buffer memory is needed when executing an immediate instruction.

2. Description of the Related Art

A buffer memory control system for executing a so-called immediate instruction is known (see Japanese Unexamined Patent Publication No. 60-123944). The immediate instruction performs a fetch operation, a store operation, or a so-called fetch and store operation (hereinafter referred to as FCH and ST). The FCH and ST performs, successively, a read out operation from and write in operation to the same address of the main memory.

In general, in a data processing system, a buffer memory is provided in a central processing unit, and data obtained by fetching (reading) data from a main memory of the central processing unit is stored in the buffer memory. The buffer memory has a smaller capacity but a shorter access time than the main memory. In the subsequent memory fetching, when the desired data is stored in the buffer memory, memory accessing is carried out to the buffer memory. When the desired data is not stored in the buffer memory, one block of data including the desired data is moved-in from the main memory to the buffer memory, and the buffer memory is then accessed to execute an instruction, thus allowing faster memory access.

In such a data processing system having a buffer memory, when a read out operation and write in operation are to be successively effected at the same address of the main memory, if the data at the same address is not stored in the buffer memory, one block (for example, 64 bytes) of data desired is moved-in (transferred) from the main memory to the buffer memory. The one block of data includes n subblocks, where n is a positive integer. The n subblocks are moved-in to the buffer memory one by one. The first subblock includes the desired data. Therefore, during the above mentioned move-in operation, the operand data (for example, the heading or the first X bytes) necessary for executing the above-mentioned immediate instruction is registered at an earlier stage in the buffer memory.

Conventionally, the execution of the immediate instruction is effected only after the move-in operation of one block is fully completed.

However, in view of the before mentioned circumstances, if the above-mentioned immediate instruction could be executed on the data during the move-in operation, the immediate instruction could be effected at an even earlier stage.

SUMMARY OF THE INVENTION

It is an object of the present invention to provide a buffer memory control system which can shorten the processing time of the immediate instruction by executing a fetch access or a store access after the move-in of the heading or the first subblock of, for example, 8 or 16 bytes, and before the completion of the block fetch of 64 bytes.

BRIEF DESCRIPTION OF THE DRAWINGS

The above object and features of the present invention will be more apparent from the following description of the preferred embodiments with reference to the accompanying drawings, wherein:

FIGS. 4, 4A and 4B are block diagram illustrating the structure of the buffer memory control unit in the system shown in FIG. 1;

FIG. 6 is a time chart of the operation of the system shown in FIG. 5; and, FIG. 7 is a block diagram illustrating the structure of the block fetch control unit in the buffer memory control unit shown in FIGS. 4 or 5.

DESCRIPTION OF THE PREFERRED EMBODIMENTS

Figure 1:
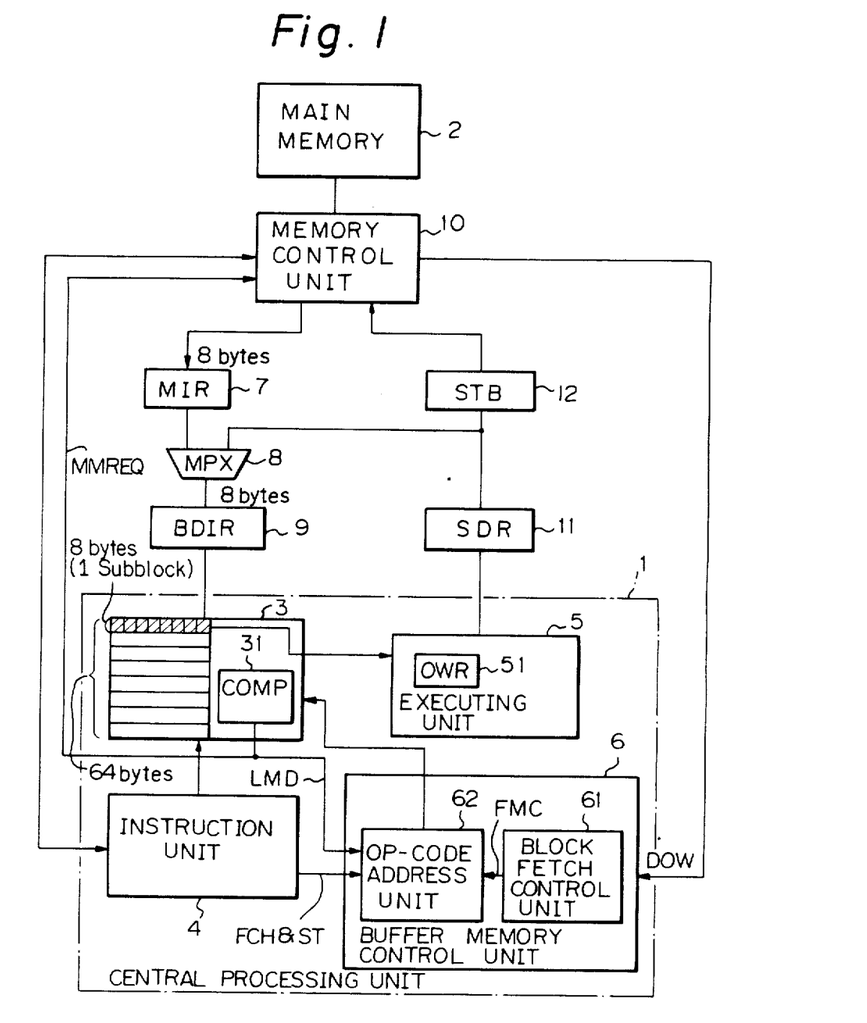
FIG. 1 is a block diagram illustrating a buffer memory control system according to an embodiment of the present invention.

FIG. 1 is a block diagram illustrating a buffer memory control system according to an embodiment of the present invention. In the figure, the buffer memory control system includes a central processing unit (CPU) 1 and a main memory 2. The CPU 1 includes an associative type buffer memory 3 for storing a copy of a portion of the data stored in main memory 2, an instruction unit 4 for providing an instruction (such as the FCH and ST instruction, for reading data from an address in the buffer memory 3 and the subsequent writing of the results of a calculation into the same address), an executing unit 5 (for executing the above-mentioned calculation), and a buffer memory control unit 6.

The buffer memory 3 includes a comparison unit 31 for detecting whether or not the data in question is stored in the buffer memory 3. The comparison unit 31 is a tag portion, or in other words, an address portion, in the buffer memory 3. The buffer memory 3 is both a set associative type and a store-through type.

If the desired data is not stored in the buffer memory 3, the comparison unit 31 generates a block fetch request signal (MM REQ) which is transferred to the main memory 2. As a result, a block comprised of m subblocks of data desired is moved-in from the main memory 2 to the buffer memory 3. In this embodiment, the block of data consists of 64 bytes, and the subblock consists of 8 bytes. The move-in operation is effected successively, unit by unit, each unit consisting of one of the subblocks.

The buffer memory control unit 6 includes a block fetch control unit 61 and an operation code and address unit 62. The block fetch control unit 61, in response to a data out warning (DOW) signal from a memory control unit 10 generates a first move-in complete (FMC) signal indicating that the move-in of the first subblock from the main memory 2 to the buffer memory 3 is completed.

In response to the first move-in complete (FMC) signal, the operation-code and address unit 62 accesses the buffer memory 3 so that the executing unit 5 starts to execute a fetch access or a store access from the buffer memory 3. The executing unit 5 includes an operand word register 51 (hereinafter referred to as an OWR). A move-in register 7 (hereinafter referred to as a MIR), a multiplexer 8, and a buffer data-in register 9 (hereinafter referred to as a BDIR) are connected in series between the memory control unit 10 and the buffer memory 3. A store-data register 11 (hereinafter referred to as an SDR) and a store buffer 12 (hereinafter referred to as an STB) are connected in series between the memory control unit 10 and the executing unit 5. The pipe line control is well known and, therefore, is not specifically shown.

In the buffer memory control system shown in FIG. 1, the transfer of one block (n bytes×m subblocks) of move-in data from the main memory 2 to the buffer memory 3 is carried out subblock by subblock, with each subblock consisting of n bytes (n and m are positive integers), and the write-in is carried out with an n-byte subblock.

Therefore, in a transfer of, for example, an 8 byte subblock, when one block of data consisting of 64 bytes is to be transferred, write-in to the buffer memory 3 is executed a total of eight times.

Examples of the format of the instruction "IMMEDIATE", fetched from the main memory 2 to the instruction unit 4, will be described with reference to FIGS. 2A, 2B, and 2C.

Figure 2A:
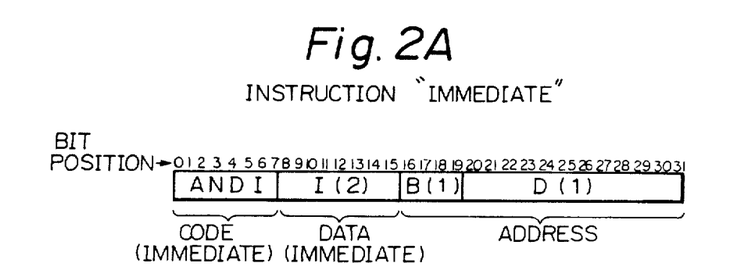
FIGS. 2A through 2C are tables of the formats of an "IMMEDIATE" instruction applied to the system according to the present invention.

An AND IMMEDIATE instruction is shown in FIG. 2A. The numerals 0 to 31 indicate bit positions. The AND IMMEDIATE instruction consists of ANDI as the operation code, I(2) as the data, and B(1) and D(1) as the address. B(1) is the number designating the base register B(1), and D(1) is the displacement with regard to the base address. The logical product of the content of 1 byte in the address defined by the content of the base register B(1) and the value of D(1) and the content of I(2) is stored in the same operand address.

Figure 2B:
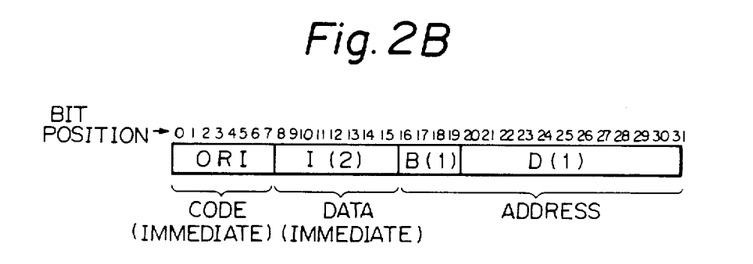

An OR IMMEDIATE instruction is shown in FIG. 2B. The OR IMMEDIATE instruction consists of ORI as the operation code, I(2) as the data, and B(1) and D(1) as the address. B(1) is the number designating the base register B(1), and D(1) is the displacement with regard to the base address. The logical sum of the content of 1 byte in the address defined by the content of the base register B(1) and the value of D(1) and the content I(2) is stored in the operand address.

Figure 2C:
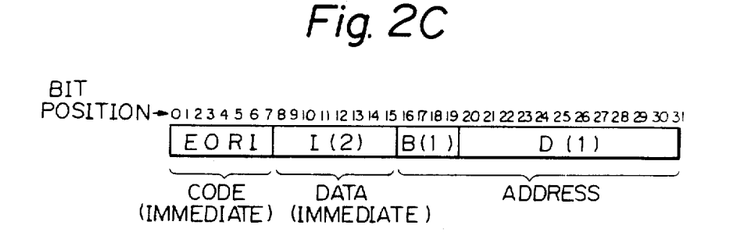

An EOR IMMEDIATE instruction is shown in FIG. 2C. The EOR IMMEDIATE instruction consists of EORI as the operation code, I(2) as the data, and B(1) and D(1) as the address. B(1) is the number designating the base register B(1), and D(1) is the displacement with regard to the base address. The exclusive logical sum of the content of 1 byte in the address defined by the content of the base register B(1) and the value of D(1) and the content I(2) is stored in the same operand address.

In general, in the case of an instruction for carrying out a fetch-and-store operation to the same address using a format such as shown in FIGS. 2A, 2B, and 2C in the buffer memory control system shown in FIG. 1, first the central processing unit CPU 1 is operated to check if the block including this operand address is stored in the buffer memory. When stored, the operand is fetched, the logic operation instructed by the instruction is carried out, and the result of the calculation is stored in the buffer memory 3. Since the buffer memory 3 is a store-through type buffer memory, the result is stored in both the buffer memory 3 and the main memory 2.

If the block including this operand address is not stored in the buffer memory 3, a read-out request for the block including this operand address is made to the main memory 2, and the read-out block is registered in the buffer memory 3. If one word is registered by one registration operation in the buffer memory 3, n registration operations to the buffer memory 3 are required for registering n words in the buffer memory 3. For example, eight registration operations are required for registering 64 bytes of data into one block of the buffer memory 3 at an 8-byte registration of data per each registration operation.

It is common knowledge that control is carried out in such a manner that the sequence of the registration operation from the main memory 2 to the buffer memory 3 is started from the word (subblock) which includes the required operand address.

According to the present invention, if the block which includes the operand address in question is not stored in the buffer memory 3, calculation is carried out when the registration of the operand data with regard to the beginning word is completed, reducing the amount of time of waiting until the full block is registered.

These instructions are fetched from the main memory 2 into the instruction unit 4. The instruction unit 4 analyses these instructions and generates an operation code and an address for executing an FCH & ST operation, i.e., for successively executing fetch (read out) and store (write in) operations by pipe line processing.

If the above-mentioned immediate instruction is used when data is to be fetched and stored from/into the buffer memory 3, the operation is as follows:

If the necessary data is not stored in the buffer memory 3, that is, when a Line Missing Detection (LMD) signal is generated (FIG. 1), the move-in operation for an 8-byte subblock is executed eight times from the main memory 2 through the buffer memory control unit (MCU) 10 into the buffer memory 3, so that a complete 64 byte block fetch is executed. The specific feature of the embodiment of the present invention can generally be described as that, in the above-mentioned move-in operation, at the time point when the heading or the first 8 bytes (the first subblock of one data block have been moved-in from the main memory 2 through the BDIR 9, into the buffer memory 3, (that is, at a first move-in complete time point (FMC)) the access from the executing unit 5 to the buffer memory 3 is started to execute the FCH & ST operation. More details of this operation are described with reference to FIGS. 3A and 3B, which are time charts showing the operation of the FCH & ST instruction when the fetch and store operand is not stored in the buffer memory 3, according to the embodiment of the present invention.

Figure 3A:
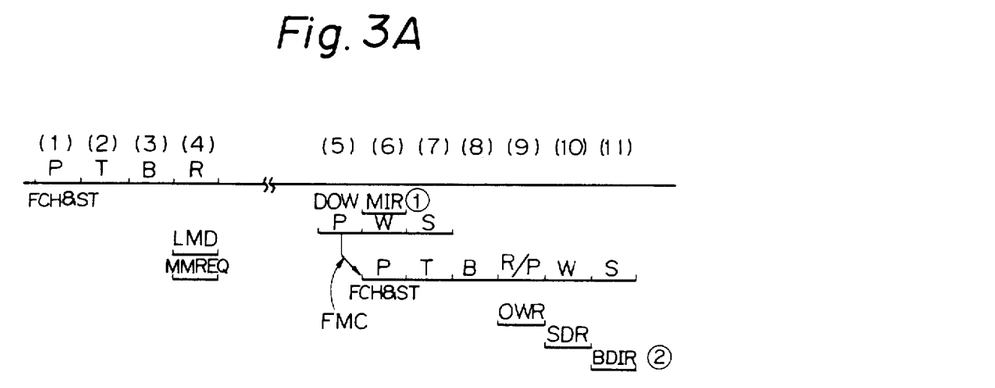
FIGS. 3A and 3B are time charts of the operation of the system shown in FIG. 1.
Figure 3B:
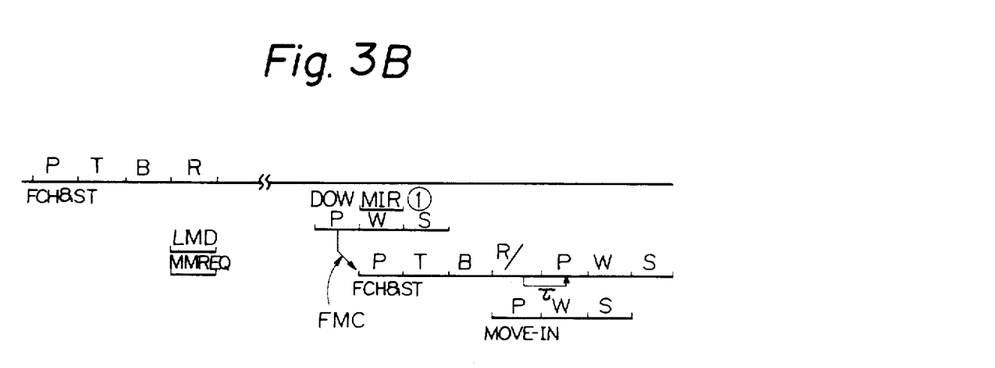

In FIGS. 3A and 3B, the sequence of the cycle for the pipeline timing consists of a priority cycle (P) for accessing the buffer memory 3, a tag access cycle (T) for reading the address portion of the buffer memory 3, a buffer read cycle (B) for reading the data portion of the buffer memory 3, a result cycle (R) of post-processing, a write tag cycle (W) for writing into the address portion of the buffer memory 3, and a store data cycle (S) for writing into the data portion of the buffer memory 3.

The process illustrated in FIG. 3A is carried out as follows.

(1) Priority Cycle (P): a FCH and ST instruction is sent from the instruction unit 4 to the buffer memory 3.

(2) Tag Access Cycle (T): The address specified by the FCH & ST instruction is read from the address portion of the buffer memory 3.

(3) Buffer Read Cycle (B): The data at the address specified by the FCH and ST instruction is read from the data portion of the buffer memory 3.

(4) Result cycle (R): As a result of the reading operation, when the data necessary for the FCH & ST operation is not stored in the buffer memory 3, a Line Missing Detection signal LMD is generated from the comparison unit 31 so that a block-fetch request signal MM REQ is transferred from the buffer memory 3 to the main memory 2.

(5) Then, a data out warning signal DOW, indicating that a subblock of data will be transferred after a certain number of machine cycles, is transferred from the memory control unit 10. Coinciding with that timing of the transfer of the subblock, a priority (P) for effecting a move-in operation is established.

(6) Then, once the beginning or the first 8 bytes (the first subblock) of the block fetch data is set in the MIR 7 during the W cycle of the storing pipe line process (P, W, and S), the First Move-In Complete signal FMC is generated from the block fetch control unit 61 (FIG. 1).

At this time, a priority (P) for executing the FCH and ST operation, which has been held in the operation code and address unit 62 (FIG. 1), is again established.

(7) The Tag Access Cycle (T) is the same as that of the process (2).

(8) In the B cycle of the FCH and ST operation, the necessary data, i.e., X bytes ($1 \leq X \leq 8$), is read out from the buffer memory 3 to the executing unit 5.

(9) The result calculated by the executing unit 5 is set, in the R cycle, into the OWR 51 in the executing unit 5. The R cycle also serves as a P cycle for the writing operation into the buffer memory 3.

(10) In the W cycle, the calculated result in the OWR 51 is transferred to the SDR 11.

(11) In the S cycle, the result in the SDR 11 is written, through the multiplexer 8 and the BDIR 9, into the buffer memory 3.

Simultaneously with the writing operation, the calculated result is also sent out from the SDR 11 throught the STB 12 to the memory control unit 10, because the buffer memory 3 is a store-through type.

The operation of fetching the remaining subblock in the desired block is successively executed by pipe line processing.

In FIG. 3A, the fetch operation is executed during the P, T, B, and R cycles at the timings (6), (7), (8), and (9); and the store operation is executed during the P, W, and S cycles at the timings (9), (10), and (11). Therefore, the fetch and store operations are carried out successively.

If the priority (P) of the store operation for the FCH and ST is in conflict with a priority (P) of the MOVE-IN operation; however, the store operation of the FCH and ST must wait for one machine cycle τ, as illustrated in FIG. 3B, because the priority of the MOVE-IN is higher than the priority of the store operation in the FCH and ST.

Figure 4A:
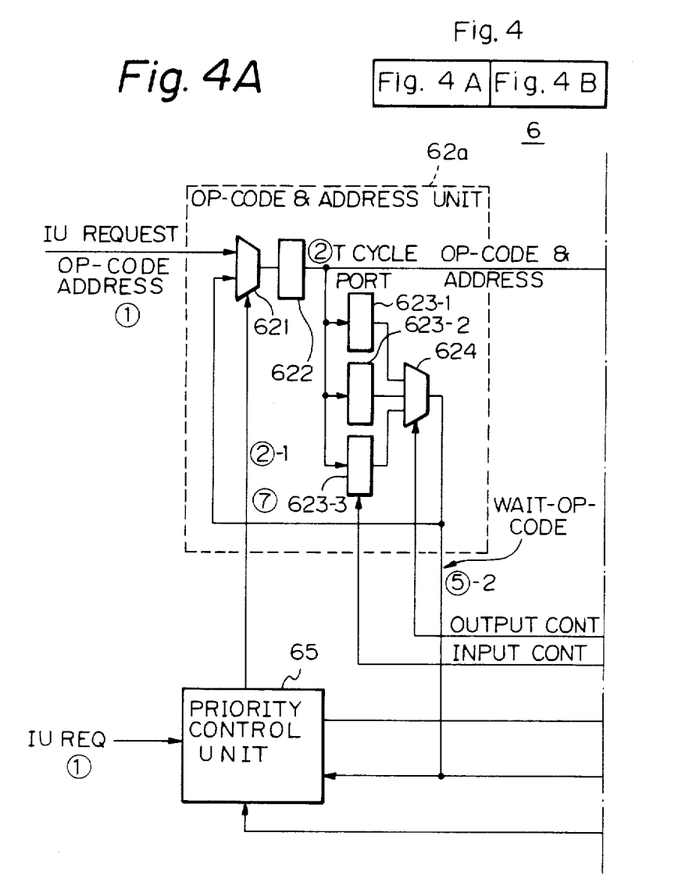
Figure 4B:
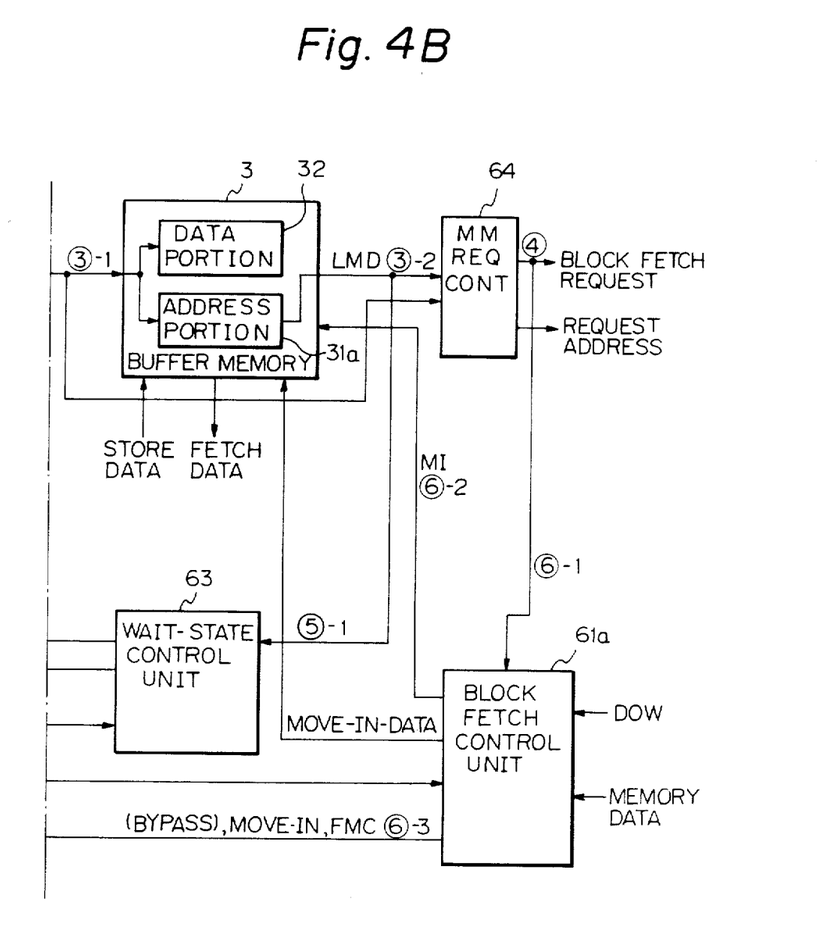

FIG. 4 is a block diagram illustrating the buffer memory 3 and the buffer memory control unit 6 of FIG. 1 in more detail.

In FIG. 4, the buffer memory 3 includes an address portion 31a and a data portion 32. The address portion 31a has substantially the same function as the comparison unit 31 in FIG. 1. The buffer memory control unit 6 includes a block fetch control unit 61a, an operation code and address unit 62a, a wait-state control unit 63, a main-memory request control unit (MM REQ CONT) 64 and a priority control unit 65. The block fetch control unit 61a has substantially the same function as the block fetch control unit 61 in FIG. 1. The operation code & address unit 62a has substantially the same function as the operation code and address unit 62 in FIG. 1 and includes a multiplexer (MPX) 621, a latching unit (LU) 622, three ports 623-1 to 623-3, and a multiplexer (MPX) 624.

The process of the FCH and ST operation of the circuit shown in FIG. 4 is carried out as follows.

①  The request for executing the FCH and ST operation including the operation code and address are transferred from the instruction unit (IU) 4 to the buffer memory control unit 6.

②  The priority control unit 65 receives the request, and then a select signal ②-1 is supplied to the multiplexer 621. In response to the select signal ②-1, the operation code and the address from the instruction unit 4 are input to the latch unit 622, during the T cycle.

③  The operation code and the address in the latch unit 622 are transferred to the buffer memory 3, as shown by ③-1. Then, the address portion 31a checks whether or not the received address is stored in the address portion 31a. If the received address and, therefore, the requested data is not stored in the buffer memory 3, the address portion 31a generates the LMD signal, as shown by ③-2.

④  Upon receipt of the LMD signal and the operation code and the address, the MM REQ CONT 64 generates a block-fetch-request signal and a request address, which are transferred to the memory control unit 10 (FIG. 1).

⑤  The LMD signal is also transferred to the wait-state-control unit 63 (⑤-1). The wait-state-control unit 63 controls the I/O operations of the ports 623-1 to 623-3. In response to the input control from the unit 63, one of the ports 623-1 to 623-3 holds the operation code and the address transferred from the instruction unit 4, In response to the output control from the unit 63 during the waiting, the held operand code and the address are output as a wait operand code and address from the multiplexer 624 (⑤-2) to the block fetch control unit 61a and to the priority control unit 65.

⑥ The block fetch control unit 61a receives the block fetch request signal (⑥-1) from the MM REQ CONT 64. When the data out warning (DOW) and memory data are transferred from the memory control unit 10 (FIG. 1) to the block fetch control unit 61a, the block fetch control unit 61a sends a control signal MI for the MOVE-IN operation to the buffer memory 3 (⑥-2). The block fetch control unit 61a also sends the first move-in-complete (FMC) signal and the signal for MOVE-IN (⑥-3) to the priority control unit 65. Since, in this case, the wait-op-code from the multiplexer 624 indicates the FCH and ST instruction, the block fetch control unit 61a does not generate a BYPASS signal (which, when used, bypasses the necessary data sent from the main memory 2 and through the buffer memory 3).

⑦ In response to the FMC signal and the wait-op-code, the priority control unit 65 generates a control signal (⑦) which is supplied to the multiplexer 621 so that the operation code and the address of the FCH and ST, which has been latched in the port 623-1 and has been sent, as the wait-op-code, to the priority control unit 62, is again input to the latch unit 622 during the T cycle (see the timing (7) in FIG. 3A).

⑧ The buffer memory 3 is accessed by the operation code and the address of the FCH and ST is again latched in the latch unit 622 during the T cycle, as described above, so that the FCH and ST operation is carried out. At this time, the LMD signal is no longer generated.

The reason for the provision of the three ports 623-1, 623-2, and 623-3 is as follows. The latch into the port 623-1 is carried out during the B cycle. The LMD signal is generated during the R cycle. The FCH and ST request is held in the port 623-1 until the LMD signal is generated. Therefore, ports 623-1, 623-2, and 623-3 are provided for respectively latching different requests, i.e., FCH and ST, FCH, and ST.

Figure 5:
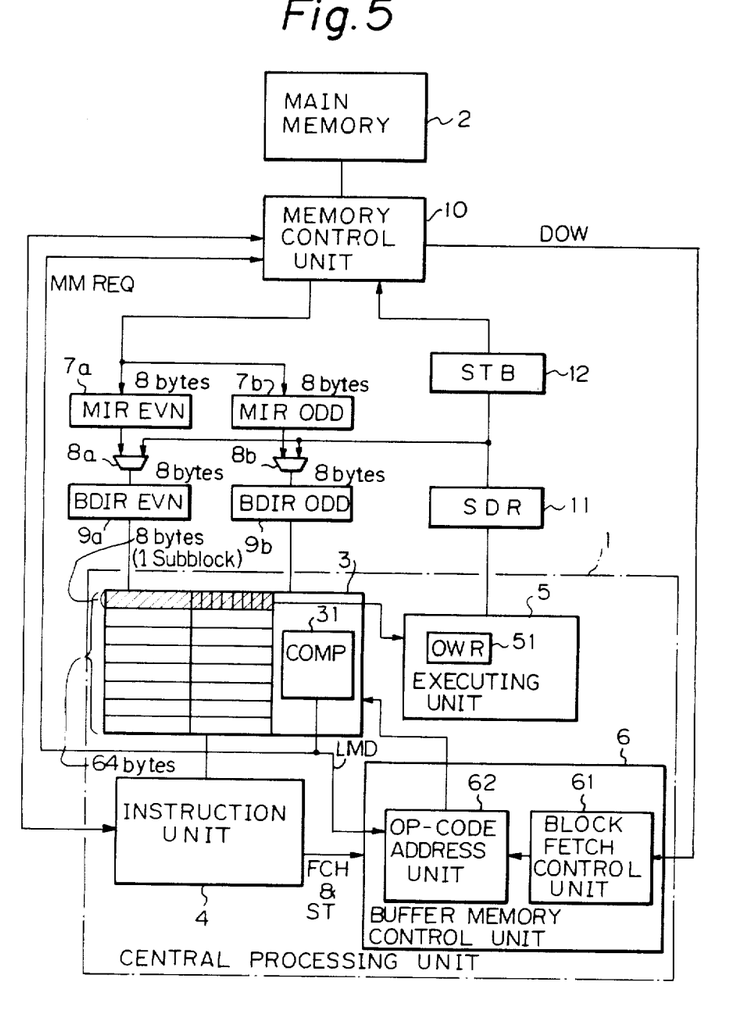
FIG. 5 is a block diagram illustrating a buffer memory control system according to another embodiment of the present invention.

FIG. 5 is a block diagram illustrating a buffer memory control system according to another embodiment of the present invention.

In FIG. 5, a move-in of one block is executed by a transfer of n bytes x×m subblocks (n is a positive integer of, for example, eight, and m is a positive even number of, for example, eight) from the main memory 2 to the buffer memory 3, and a write in to the buffer memory 3 is effected in m/2 subblocks of 2 n-byte units.

The main differences between the embodiments shown in FIG. 1 and FIG. 5 are that, in FIG. 5, there are provided two move-in registers MIR EVN 7a and MIR ODD 7b, two multiplexers 8a and 8b, and two buffer data-in registers BDIR EVN 9a and BDIR ODD 9b, in place of the single MIR 7, single multiplexer 8, and single BDIR 9 in FIG. 1. The other portions are the same as in FIG. 1 and are denoted by the same reference numerals.

Figure 6:
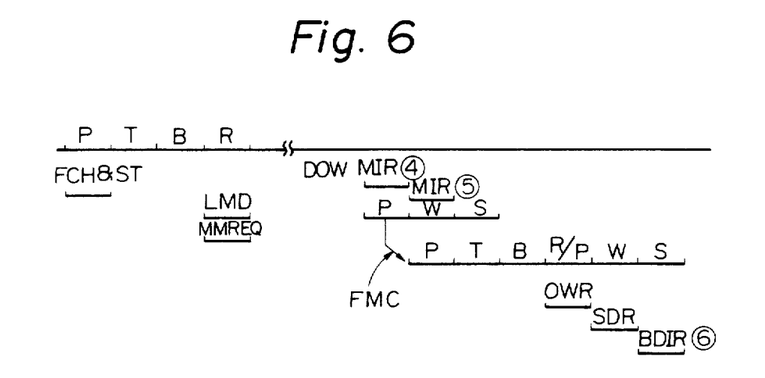

The operation of the system shown in FIG. 5 will be described with reference to FIG. 6. At first, the first 8 bytes (the first subblock) of the block fetch data are set in the MIR EVN 7a or MIR ODD 7b during the P cycle of the storing pipe line process. Next, the second 8 bytes of the block fetch data are set in the MIR ODD 7b or MIR EVN 7a (see FIG. 6 ④, ⑤). Once the 16 bytes are arranged in order, they are moved-in to the buffer memory 3 so that the before-mentioned FMC is established, as in the first embodiment. At this time, a priority (P) for processing the FCH & ST operation to the buffer memory 3 is established, and, in the B cycle, the necessary data, i.e., X bytes (1≦X≦n), is sent out to the executing unit 5. The executed result is set, in the next R cycle, into the OWR 51 in the executing unit 5; is transferred, in the W cycle, to the SDR 11, and in the S cycle, is written through the BDIR EVN 9a or BDIR ODD 9b into the buffer memory 3 (see FIG. 6, ⑥). Simultaneously, the above-mentioned executed result is sent out through the STB 6 to the memory control unit (MCV) 10. Also, the second and the subsequent block fetches accompanied by the detection of the LMD signal are successively executed.

In both of the above-mentioned embodiments, the priority (P) of the storing pipe line process for executing a move-in of subsequent block fetch data is higher than the priority (P) for the FCH and ST operation (that is, the immediate instruction process). Therefore, if there is any conflict, the FCH and ST operation will be delayed by 1 τ as described before. However, since the move-in operation is not always effected regularly, it is sufficient to shorten the processing time of the immediate instruction, according to the present invention.

Figure 7:
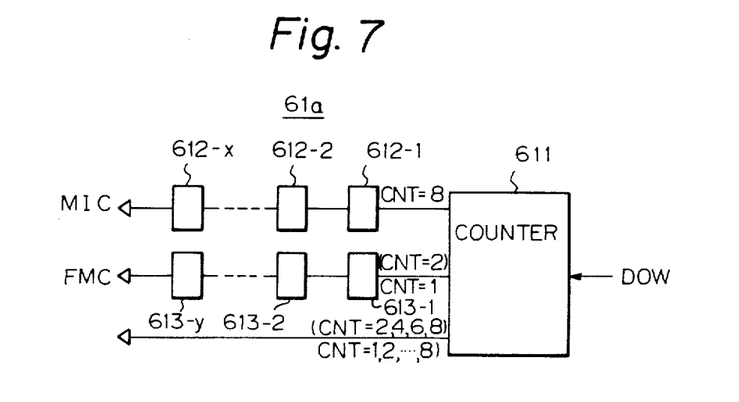

FIG. 7 is a block diagram illustrating a part of the block fetch control unit 61a shown in FIG. 4 of the first embodiment or in FIG. 5 of the second embodiment. In FIG. 7, the block fetch control unit 61a includes an up-counter 611 (which can count up to at least eight counts), latch units 612-1 through 612-x, and latch units 613-1 through 613-y. When the 8-bit counter 611 receives the data-out warning (DOW) signal from the memory control unit 10 (FIG. 1 or FIG. 5), the count value is incremented. Each time the count value is incremented in the first embodiment, or when the count value is even in the second embodiment, the control signal MI for MOVE-IN is sent to the buffer memory 3 (see FIG. 4, ⑥-2). When the count value is one in the first embodiment or two in the second embodiment, the first move-in complete (FMC) signal is generated and transferred to the priority control unit 62 (see FIG. 4, ⑥-3). When the count value is eight, that is, when the move-in of all data of one block is completed, a move-in complete (MIC) signal is generated.

In the conventional technique, the FCH and ST operation do not start until the MIC signal was generated, so that the time of required while waiting for the MIC signal was wasted for the FCH and ST operation. Conversely, according to the embodiment of the present invention, the FCH and ST operation can start immediately after the first move-in operation of the first subblock.

As described above, in the present invention, the feature resides in that, when a Line Missing signal is detected during the execution of an immediate instruction, a priority (P) for processing the immediate instruction is established to the buffer memory at a time (i.e., the FMC time point) when the first block fetch data (8 bytes) is set in the MIR 7, or when the first block fetch data (8 bytes) and the second block fetch data (8 bytes) are set in the MIR EVN 7a and the MIR ODD 7b, respectively, without waiting for completion of the 64-byte block fetch.

Accordingly, the time required for processing an immediate instruction is shortened.

What is claimed is:

1. A buffer memory control system, comprising:
   a central processing unit; and
   a main memory coupled to said central processing unit for storing data, said central processing unit including:
   a buffer memory for storing a desired portion of data stored in said main memory, said buffer memory including a comparison unit for detecting whether or not the desired portion of the data stored in the main memory is present in said buffer memory, and, if the desired data is not present in said buffer memory, said comparison unit automatically fetching a block of data including the desired data from said main memory to said buffer memory, said block of data including a plurality of subblocks, said fetching being carried out successively unit by unit, each unit consisting of one of said subblocks;
   a buffer memory control unit, coupled to said buffer memory, for controlling a read/write operation of said buffer memory, said buffer memory control unit comprising a block fetch control unit means, coupled to said main memory, for generating a first move-in complete signal indicating that the fetching of a first subblock from said main memory to said buffer memory is complete;

an instruction unit, coupled to said buffer memory control unit and to said main memory, for providing an instruction causing said buffer memory control unit to fetch data from an address in said main memory and subsequently store results of a calculation into said address; and an executing unit, coupled to said buffer memory, for accessing said buffer memory and for executing said calculation in response to said first move-in complete signal.

2. A buffer memory control system as set forth in claim 1, wherein said instruction unit comprises means for providing an immediate instruction, and said buffer memory control unit further comprises an operation-code and address unit, coupled to said instruction unit, to said block fetch control unit means, and to said buffer memory, for latching an operation code and address of an immediate instruction and, in response to said first move-in complete signal, for accessing said buffer memory to start execution of the immediate instruction.

3. A buffer memory control system as set forth in claim 2, wherein said buffer memory control unit further comprises a priority control unit, coupled to said instruction unit, to said block fetch control unit and to said operation-code and address unit, for establishing a priority, in response to said first move-in complete signal from said block fetch control unit means, to execute said immediate instruction, said priority being applied to said operation-code and address unit.

4. A buffer memory control system as set forth in claim 1, wherein said block of data consists of n×m bytes, and the move-in of said block of data from said main memory to said buffer memory is carried out m times for an n-byte subblock, when n and m are positive integers and n bytes constitute said one of said subblocks.

5. A buffer memory control system as set forth in claim 1, wherein said block of data consists of n×m bytes, the move in of said block of data from said main memory to said buffer memory is carried out m times for an n-byte subblock, and the move-in of said block of data from said main memory to said buffer memory is carried out m/2 times for a 2n-byte subblock, where n is a positive integer, m is a positive even integer, and n bytes comprise one of said subblocks.

6. A buffer memory control system as set forth in claim 1, wherein, said comparison unit further comprises means for generating a line missing signal, and said buffer memory control unit further comprises a main memoryrequest control unit, coupled to said buffer memory, to said main memory, and to said block fetch control unit, for generating a block fetch request signal, in response to a line missing signal generated by said comparison unit indicating that said data in question is not present in said buffer memory, said block fetch request signal being transferred to said main memory and to said block fetch control unit means.

7. A data processing system, comprising:

a main memory; and processing means for transferring a block of data having subblocks into said processing means from said main memory, storing a first subblock of said block and performing an access operation on said first subblock while the remainder of said block is being transferred into said processing means.

8. A data processing system, comprising:

a main memory; and processing means for transferring a block of data having subblocks into said processing means from said main memory and performing an access operation on a first subblock while other subblocks are being transferred, said processing means comprising:

storage means for storing the block of data;

control means for controlling a read/write operation of said storage means and for generating a signal indicating that the first subblock has been transferred into said storage means; and executing means for starting a memory access operation in said storage means in response to the signal from said control means indicating that the first subblock has been transferred into said storage means.

9. A data processing system as set forth in claim 8, said processing means further comprising instruction means for providing an immediate instruction having an operation code and address.

10. A data processing system according to claim 8, said control means comprising operation-code and address means, coupled to said instruction means and to said storage means, for reading the operation-code and address of an immediate

* * * * *